UNITED STATES PATENT OFFICE.

DANIEL W. MACDONALD AND JOHN G. FLOWER, OF BOSTON, ASSIGNORS, BY DIRECT AND MESNE ASSIGNMENTS, TO CHARLES J. BAILEY, OF NEWTON, AND MARINER S. LAWRENCE, OF BOSTON, MASSACHUSETTS.

DISINFECTANT.

SPECIFICATION forming part of Letters Patent No. 423,875, dated March 18, 1890.

Application filed June 22, 1889. Serial No. 315,223. (No specimens.)

*To all whom it may concern:*

Be it known that we, DANIEL W. MACDONALD, a subject of Her Majesty the Queen of Great Britain, and JOHN G. FLOWER, a citizen of the United States of America, residing at the city of Boston, in the county of Suffolk and State of Massachusetts, have invented certain new and useful Improvements in Disinfectants, of which the following is a full, clear, and exact description.

This improved disinfectant, in substance, is composed of boracic acid and salicylic acid, in combination with permanganate of potash and either silicate of soda or of potash, and with or without fresh-water sand substituted for a portion of the silicate of soda or of potash.

The ingredients named are mixed together in or about the proportions as follows: boracic acid, ten parts; salicylic acid, ten parts; permanganate of potash, forty parts; silicate of soda or of potash, or of both, forty parts. If fresh-water sand is used, then silicate of soda or of potash, or of both, thirty parts; and fresh-water sand, ten parts.

The disinfectant, compounded, as stated, is a solid, and is hard and stony, and the disinfectant and deodorizing elements of the compound are put into action, preferably, by placing it in the water-tanks of the water systems of dwelling-houses, buildings, &c., and from which the water-closet and urinal-bowls are supplied with water, and thus charging the water therewith preparatory to its distribution through the bowls secure their disinfection. The compound, however, may be placed in the bowls in any suitable way for the water as distributed through them to run in contact with it.

The compound is thoroughly disinfecting and deodorizing, and also very serviceable and useful for washing and cleaning painted and varnished surfaces, and being a solid and hard or stony, as described, its absorption by water, when placed therein—as, for illustration, as has been described—is comparatively slow, but yet sufficiently rapid for all practical purposes. Again, the compound is serviceable for hospitals and all other sanitary uses, and also for the preservation of meats.

While the proportion of the several ingredients herein named have been found to be most suitable and efficient, the invention is not to be limited thereto.

We are aware that boracic acid and salicylic acid have been united, and that we do not claim; but What we do claim, and desire to secure by Letters Patent, is—

The compound herein described, the same being composed of boracic acid and of salicylic acid, in combination with the permanganate of potash and a silicate, substantially as described, for the purposes specified.

In testimony whereof we have hereunto set our hands in the presence of two subscribing witnesses.

DANIEL W. MACDONALD.
JOHN G. FLOWER.

Witnesses:
ALBERT W. BROWN,
HENRY F. MCKEEVER.